United States Patent Office 3,366,616
Patented Jan. 30, 1968

3,366,616
NOVEL POLYMERIC COMPOSITIONS OBTAINED BY THE POLYMERIZATION OF 1-PHENYLCYCLOBUTENE OR BICYCLO(4.2.0)OCT-7-ENE
Raymond Frank Tietz, Greenmeadow, Wilmington, Del., assignor to E. I. du Pont de Nemours and Company, Wilmington, Del., a corporation of Delaware
No Drawing. Filed Dec. 9, 1964, Ser. No. 417,206
3 Claims. (Cl. 260—93.1)

The present invention relates to novel polymeric compositions obtained by the polymerization of 1-phenylcyclobutene or bicyclo(4.2.0)oct-7-ene.

It was heretofore known that monocyclic and polycyclic olefins having at least one unsubstituted ring double bond and not more than one double bond in each ring could be cleaved and polymerized to give polymers containing recurring units in which the unit has one ring structure less than the original monomer. Such polymers, whose preparation by use of combined metal oxide and metal hydride catalysts is described in U.S. Patent 3,074,918, are generally rubbery solids from which crosslinked elastomeric hydrocarbon polymers can be prepared. Conversely, polymerization of a completely unsubstituted monocyclic olefin monomer with concomitant retention of the cyclic structure is described in French Patent 1,338,055. The latter patent describes the polymerization of cyclobutene into two different crystalline, stereoregular homopolymers, each of which is characterized by an enchained ring structure free of olefinic unsaturation. These polymers are reported to be extrudable into filaments and heat pressable into foils. The nature of the product obtained depends upon the choice of the so-called coordination catalyst employed, since it is shown that certain of these catalysts will produce cyclobutene polymers possessing olefinic unsaturation. This catalyst-cyclobutene polymer relationship is amplified elsewhere in the literature, e.g., J. Polymer Sci., Pt. B, Polymer Letters, 2, 349–51 (1964) wherein it is emphasized that such polymerizations proceed with catalysts acting through so-called coordinated anionic mechanisms, but not through cationic, "classical" anionic, or radical mechanism. The difficulties encountered in polymerizing various unsubstituted, non-conjugated cycloolefins, due to steric hindrance are noted in Angew. Chem., 76, 350 (1964).

It is an object of the present invention to prepare novel, fabricable, high-melting hydrocarbon polymers from substituted, sterically-hindered cyclobutene monomers.

It is a further object of the present invention to provide novel, high-melting hydrocarbon polymers from 1-phenylcyclobutene by processes employing polymerization catalysts which act through anionic, cationic, free radical, and coordinated anionic mechanisms.

It is a still further object of the present invention to prepare novel, high-melting hydrocarbon polymers from bicyclo(4.2.0)oct - 7 - ene, or 3,4 - tetramethylenecyclobutene.

These and other objects will become apparent from the description and examples which follow.

In accordance with the present invention, novel high-melting hydrocarbon polymers having an inherent viscosity of at least about 0.2, (measured as a 0.5% solution in decahydronaphthalene at 130° C.) consisting essentially of the following recurring structural units are provided:

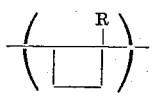

wherein R represents a phenyl radical. As part of the intralinear polymer chain there may also be present phenoprene units having the structure

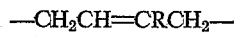

wherein R represents a phenyl radical. These phenoprene units constitute less than about 10% of the total number of units in the polymer chain.

Another achievement of this invention is accomplished by providing novel, high-melting hydrocarbon polymers having an inherent viscosity of at least about 0.1 (measured as a 0.5% solution in chloroform at 30° C.) consisting essentially of the following recurring bicyclo-(4.2.0)oct-7-,8-ylene structural unit

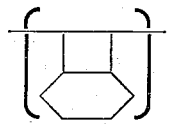

As part of the intralinear polymer chain there may be present recurring cycloocten-3,8-ylene units of the following structure

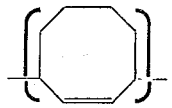

These latter units constitute less than about 25% of the total number of units in the polymer.

That these high-melting, fabricable, hydrocarbon polymers are obtained from the appropriate sterically-hindered monomers is indeed unusual. This is particularly surprising since it has been discovered that related, sterically-hindered monomeric species polymerize to yield only rubbery or low-melting products. Thus, application of the process of this invention to 1-methylcyclobutene produces a soft rubber in low yield. Similar treatment of 3-methylcyclobutene produces a polymer which exhibits a crystalline melting point of 165° C. The disubstituted 3,3-dimethylcyclobutene yields a polymer which has a crystalline melting point of about 110° C. In contrast to these results, bicyclo(4.2.0)oct-7-ene polymerizes to a product possessing a polymer melt temperature of about 260° C. and 1-phenylcyclobutene polymerizes to a product having a crystalline melting point of about 280° C.

A typical polymerization according to one process of this invention, using a catalyst system acting through an anionic-coordinated mechanism, is described as follows. A reaction flask containing a magnetic stirring bar is fitted with a nitrogen inlet tube, an injection port sealed with a rubber serum cap, and a drying tube. The apparatus is swept with dry nitrogen and a quantity of a pure, dry hydrocarbon solvent is injected, along with a quantity of an appropriate catalyst, e.g., a combination of titanium tetrachloride and triisobutylaluminum. A sample of the appropriate monomer is injected into the flask and the flask and its contents are brought to polymerization temperature. The stirred reaction mixture is maintained for a period of about 1 to 24 hours within the temperature range of −80° C. to 50° C. At the conclusion of the reaction period the polymer is precipitated by adding the reaction mixture to a quantity of alcohol containing a small amount of concentrated hydrochloric acid. The precipitated polymer is then removed, rinsed with alcohol, and dried in a vacuum oven.

Anionic coordination catalysts which have utility in the process of this invention for preparing polymers from 1-phenylcyclobutene include vanadium triacetylacetonate and diethylaluminum chloride, titanium tetrachloride and triisobutylaluminum, and vanadium tetrachloride and triethylaluminum. In addition to the above-described polymerization procedure, 1-phenylcyclobutene can be polymerized by catalysts which operate through an anionic mechanism, e.g., lithium naphthalene, or through a cationic mechanism, e.g., boron trifluoride etherate, or a free radical polymerization mechanism, e.g., azobis(isobutyronitrile). These later three catalyst systems are utilized in accordance with procedures which are well known in the art. Anionic coordination catalysts which are useful for preparing high-melting polymers from bicyclo(4.2.0)oct-7-ene include vanadium triacetylacetonate and diethylaluminum chloride, vanadium tetrachloride and triethylaluminum, and vanadium tetrachloride and triisobutylaluminum.

The polymers of the present invention are useful for the preparation of high-melting films by melt-pressing techniques well known in the art. Filaments may also be prepared from these polymers.

The following nonlimiting examples are illustrative of the practice of the preferred embodiments of the invention. In these examples, inherent viscosity has been determined in accordance with the following equation:

$$\eta_{inh} = \frac{\ln \eta_{rel}}{C}$$

The relative viscosity ($\eta_{rel}$) may be determined by dividing the flow time in a capillary viscometer of a dilute solution of the polymer by the flow time for the pure solvent. The concentration (C) used in the examples is 0.5 gm. of polymer per 100 ml. of solution. The temperatures and solvents used for the viscosity measurements are mentioned in the examples.

*Example I*

This example illustrates polymerizations of 1-phenylcyclobutene by use of catalysts which act through coordination, anionic, cationic, and free radical mechanisms, respectively. The differences in melting point of polymer resulting from the various preparations is attributable to differences in the degree of polymer crystallinity. Infrared data establishes the substantial absence of phenoprene units in the polymer.

*Part A.*—A 10-ml. flask containing a magnetic stirring bar is fitted with a nitrogen inlet, an injection port sealed with a rubber serum cap and a drying tube. Through the serum cap are injected 5 ml. of dry pentane, 0.05 ml. titanium tetrachloride, and 0.34 ml. triisobutylaluminum. After the resulting slurry is stirred for a few minutes, 1.0 ml. of 1-phenylcyclobutene, preparable by the procedure described in J. Med. Pharm. Chem., 2, 678 (1960), is injected. The black slurry thus formed is stirred for about 16 hours at room temperature, after which it is poured into a solution of dilute, methanolic hydrogen chloride to precipitate the polymer. The isolated polymer, after being washed and dried, consists of 0.35 g. of white powder which is insoluble in boiling decahydronaphthalene. The polymer exhibits a crystalline melting point of 270° C. and medium X-ray crystallinity.

*Part B.*—A catalyst solution is prepared by adding 0.3 g. of lithium to a solution of 3 g. of naphthalene in 10 ml. of tetrahydrofuran under anhydrous conditions. A solution of 0.6 ml. of 1-phenylcyclobutene in 2.5 ml. of tetrahydrofuran, maintained in a dry nitrogen atmosphere and cooled to about −50° C., is treated slowly and dropwise with the previously-described catalyst solution until a deep, red-brown color persists. Twenty minutes after the catalyst addition is completed, the colored reaction solution is poured into a dilute solution of ethanolic hydrogen chloride to precipitate the polymer. The product, after being washed and dried, consists of 0.31 g. of white solid material which is soluble in boiling decahydronaphthalene; $\eta_{inh}$=0.20 (at 130° in decahydronaphthalene). The polymer exhibits a crystalline melting point of 225° C. and low X-ray crystallinity.

*Part C.*—In a glass tube, cooled by liquid nitrogen, is placed 2 ml. of dry methylene chloride, 0.47 ml. of 1-phenylcyclobutene, and 1 drop of boron trifluoride etherate. The reaction tube is sealed and successively placed in various cooling baths for the times indicated: a −80° C. bath for 2 hours, a −60° C. bath for 0.5 hour, and a −40° C. bath for 1.5 hours. The tube is opened and the contents, a yellow slurry, are poured into methanol. The dried product consists of 0.05 g. of a white solid polymer which is insoluble in boiling decahydronaphthalene. This product exhibits a crystalline melting point of 280° C. and exhibits high X-ray crystallinity.

*Part D.*—In a glass tube, under a nitrogen atmosphere, are sealed 1.0 ml. of 1-phenylcyclobutene and 0.005 g. of azobis(isobutyronitrile). The tube is maintained at about 63° C. for 30 days. The tube is then opened and the resulting hazy gel is poured into methanol to precipitate the polymer. The dried, white, granular product weighs 0.18 g., is soluble in boiling decahydronaphthalene; $\eta_{inh}$=0.40 (at 130° C. in decahydronaphthalene). The polymer exhibits a crystalline melting point of 205° C. and low X-ray crystallinity.

*Example II–A*

This example illustrates the polymerization of bicyclo(4.2.0)oct-7-ene by use of a coordination-type catalyst system.

In a reaction vessel similar to that described in Example I–A, above, are placed 5 ml. of dry, distilled toluene, 0.125 g. of vanadium triacetylacetonate, and 2 ml. of bicyclo(4.2.0)oct-7-ene. The latter material is preparable by the procedure disclosed in Angew. Chem., 65, 346 (1953). The reaction flask and its contents are cooled in a −50° C. bath, 0.23 ml. of diethylaluminum chloride are injected, and stirring of the solution is begun. Stirring is maintained for 45 minutes after which time the flask and its contents are allowed to remain in the bath for an additional 1.25 hours. The contents of the flask are then poured into methanolic hydrogen chloride to quench the reaction and precipitate the polymer. The polymer thus obtained is washed with a mixture of methanol and hydrochloric acid and then with methanol. The product is dried in an 80° C. vacuum oven. The dried, white, powdery product weighs 1.53 g., exhibits a polymer melt temperature of 260° C., and is soluble in chloroform; $\eta_{inh}$=0.10 (at 30° C. in chloroform). Clear, colorless films can be melt-pressed from this polymer.

Infrared and nuclear magnetic resonance spectroscopy data show that this polymer consists of about 20% cyclo-octen-3,8-ylene units and of about 80% bicyclo(4.2.0)oct-7,8-ylene units.

*Example II–B*

This example illustrates the polymerization of bicyclo(4.2.0)oct-7-ene to a high melting polymer consisting essentially of bicyclo(4.2.0)oct-7,8-ylene units.

In a 10-ml. flask cooled in a −50° C. bath, in a nitrogen atmosphere, are placed 1.5 ml. of bicyclo(4.2.0)oct-7-ene, 2 ml. of dry,olefin-free n-pentane, 0.04 ml. of vanadium tetrachloride, and 1.15 ml. of triethylaluminum. The resulting solution is left in the bath and is stirred for 1 hour. The solution is then removed from the bath and poured into methanolic hydrogen chloride to quench the reaction and precipitate the polymer. The final product obtained, purified and dried as described in Example II–A, is 0.4 g. of white powder having a polymer melt temperature of 260° C. This polymer exhibits low X-ray crystallinity and is soluble in boiling Arochlor 1248 (trademark for Monsanto Co.'s chlorinated hydrocarbon having a boiling range of 330°–370° C.)

Infrared and nuclear magnetic spectroscopy data show that this polymer consists of about 97.5% bicyclo(4.2.0)oct-7,8-ylene units and about 2.5% cycloocten-3,8-ylene units.

A similar polymer, having a crystalline melting point of 260° C. and exhibiting low X-ray crystallinity, is obtained when a sample of bicyclo(4.2.0)oct-7-ene is polymerized for 16 hours at room temperature, using a vanadium tetrachloride and triisobutyl aluminum catalyst (1:3 mole ratio). Clear, colorless films can be melt-pressed from this polymer.

*Example II–C*

This example illustrates the polymerization of bicyclo (4.2.0)oct-7-ene to a moderately unsaturated, low-melting polymer composed principally of cycloocten-3,8-ylene units. While the TiCl₄ catalyst system provided good results when used with 1-phenylcyclobutene (e.g., Example I, Part A), its use with bicyclo(4.2.0)oct-7-ene leads to monomer rearrangement and to production of a lower melting copolymer having a significantly larger amount of unsaturation than polymers obtained by use of vanadium catalysts (Examples II–A and II–B). This is shown by the following:

In a glass tube, under a nitrogen atmosphere, are placed 2 ml. of dry, olefin-free n-pentane, 2 ml. of bicyclo(4.2.0) oct-7-ene, and 0.05 ml. of titanium tetrachloride in the order indicated. Into the reaction mixture, cooled in a −80° C. constant temperature bath, is injected 0.34 ml. of triisobutyl aluminum. The tube containing the brown reaction mixture is sealed under nitrogen, removed from the bath, and rotated to mix the brown, opaque, non-viscous reaction solution. Foaming occurs within the tube and its contents solidify. The tube is returned briefly to the −80° C. bath, after which it is removed and allowed to warm at room temperature for 30 minutes. The tube's contents is removed and poured into methanolic hydrogen chloride to quench the reaction and precipitate the polymer. The dark, rubbery product is washed several times with methanolic hydrogen chloride to give a light yellow solid which, after being dried in a 60° C. vacuum oven, weighs 1.6 g. and exhibits a polymer melt temperature of 150° C.

Nuclear magnetic resonance spectroscopy data show that this polymer consists of about 60% cycloocten-3,8-ylene units and of about 40% bicyclo(4.2.0)oct-7,8-ylene units.

*Example III*

This example illustrates the polymerization of 3-methylcyclobutene by use of a coordination-type catalyst system.

In accordance with previously described procedures, 0.125 g. of vanadium acetylacetonate, 5 ml. of dry toluene, and about 2 ml. of 3-methylcyclobutene are cooled to −50° C. To this cooled solution is added 0.23 ml. of diethylaluminum chloride. After maintaining the above reaction mixture for 1.5 hour at −50° C., the reaction mixture is stirred overnight while being permitted to warm up gradually. The reaction is quenched by pouring the mixture into methanolic hydrogen chloride solution to give a white powder which, after being dried, weighs 1.46 g. and exhibits a crystalline melting point of 165° C. The product is soluble in cold chloroform and in decahydronaphthalene; $\eta_{inh}$=0.26 (at 30° C. in chloroform).

*Example IV*

This example illustrates the polymerization of 3,3-dimethylcyclobutene to a low-melting polymer.

The necessary monomer is prepared by the following procedure. 3,3-dimethylcyclobutene carboxylic acid is treated with hydrazoic acid under the conditions of the Schmidt reaction and the resulting amine is dimethylated with formaldehyde and formic acid. This amine is subsequently quaternized with methyl iodide, the iodide converted by silver oxide to the corresponding hydroxide, and the latter compound pyrolyzed to give 3,3-dimethylcyclobutene, boiling range 39°–42° C. (760 mm.).

In accordance with previously described procedures, a reaction mixture consisting of 3 ml. of dry olefin-free pentane, 0.05 ml. of titanium tetrachloride, 0.34 ml. of triisobutylaluminum, and 1 ml. of 3,3-dimethylcyclobutene are sealed under nitrogen and maintained at −80° C. for a period of approximately two days. The reaction is quenched in methanolic hydrogen chloride to produce 0.13 g. of a white, powdery polymer which, after being dried, exhibits a crystalline melting point of about 110° C.

What is claimed is:

1. A novel high-melting linear hydrocarbon polymer having an inherent viscosity of at least about 0.1, when measured as a 0.5% solution in chloroform at 30° C., and a melting temperature of about 260° C. consisting essentially of the following recurring structural unit

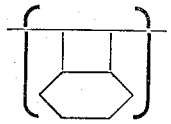

2. The polymer of claim 1 containing up to about 25% of the following units as part of the intralinear polymer chain

3. A novel high-melting linear hydrocarbon polymer having an inherent viscosity of at least about 0.2, when measured as a 0.5% solution in decahydronaphthalene at 130° C., and a melting point of at least about 205° C., consisting essentially of the following recurring structural unit

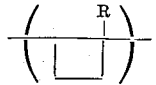

wherein R represents a phenyl radical.

References Cited

UNITED STATES PATENTS 3,215,683　11/1965　Mahlman _____ 260—93.1
3,252,956　 5/1966　Natta et al. _____ 260—93.1

OTHER REFERENCES

Chem. Abs. 54: 665d.
Chem. Abs. 55: 17607c.

JOSEPH L. SCHOFER, *Primary Examiner.*

L. EDELMAN, *Assistant Examiner.*